Patented Jan. 25, 1949

2,460,126

UNITED STATES PATENT OFFICE 2,460,126

INSULATING AND DIELECTRIC COMPOSITIONS

Frank M. Clark, Pittsfield, Mass., assignor to General Electric Company, a corporation of New York No Drawing. Application October 23, 1945, Serial No. 624,087

3 Claims. (Cl. 252—66)

The present application is a continuation-in-part of prior application Serial No. 568,789, (now abandoned) filed December 18, 1944, and relates to compositions of liquid halogenated hydrocarbons, and in particular liquid chlorinated hydrocarbons such as are used for cooling, insulating and dielectric purposes in electric devices.

Halogenated aryl hydrocarbons are relatively stable compounds. Decomposition of a halogenated aryl composition in electric devices, however, occurs when such composition comes into contact with an electric arc. Halogen halides formed as a result of this decomposition will attack and seriously affect the mechanical strength of cellulosic insulation which may be present in the apparatus.

In accordance with my invention, halogenated compositions are associated with a small amount of a compound of a metal and an organic acid whereby such hazardous effect of a halogenated decomposition product is eliminated. The compounds of naphthenic acid, which hereinafter are dealt with, are soluble in liquid halogenated aryl hydrocarbons, and in particular in the commonly employed mixture of trichlorbenzene and chlorinated diphenyl and therefore are available at once for chemical reaction in case undesired decomposition products should be formed.

A common operating temperature for liquid-cooled transformers is 75° C. Cellulose insulation, as for example manila or kraft paper, cotton, pressboard or the like, even when carefully dried and impregnated with the usual chlorinated liquids, will deteriorate rapidly in the presence of a liquid containing dissolved hydrogen chloride or other halide acid. When subjected to an electric arc, the amount of hydrogen chloride dissolved in the liquid may vary even up to the complete saturation of the liquid. In the latter case, the insulation will blacken in a few hours, become brittle, and lose 75 per cent or more of its initial tensile strength. Transformer windings, removed from the transformer tank for repair, will deteriorate rapidly even at room temperature because of absorbed hydrogen chloride in the insulation and its accelerated reactivity with the cellulose in the presence of normally humid air. Even a small amount of internal arcing in an electric device containing a halogenated liquid might lead ultimately to its destruction, or may seriously impair and shorten its useful commercial life.

I have discovered that halogen decomposition products can be rendered substantially innocuous with respect to the members of electric devices if, in accordance with my present invention, the electric device or the halogenated hydrocarbon is associated with a suitable fixative consisting of a compound of metal and organic acid. This type of compound is termed herein as a "protective agent."

The acid radical of such compound in carrying out my invention may be chosen from the class of acids consisting of aromatic, fatty, hydroxy-fatty, and cyclo-paraffinic acids. The metallic component is preferably zinc, tin, sodium or lead, although copper, aluminum, lithium, and similar metals, including the ammonium group which is the equivalent of a metal component, are of practical utility. Such compounds are added to the halogenated composition or in the insulation to be protected in small amounts varying somewhat with conditions, for example, the nature of the materials involved and the chosen compound. The amount of protective agent should be present in such small quantity that the physical properties of the liquid, such as the viscosity and the pour point, are not materially affected. A material increase of viscosity would alter the heat-dissipating properties of such materials. In general, the halogenated compound may be associated with an amount of protective agent approximating about one-half to one per cent by weight or even less.

A conventional mixture of chlorinated diphenyl and trichlorbenzene which is employed as a dielectric and cooling medium in transformers and other electric devices has a normal viscosity of about 58 seconds (Saybolt Universal) at 100° F. (37.8° C.). In general, the viscosity should be sufficiently low to permit the free circulation of thermal currents whereby heat is dissipated. In the design of a transformer, especial care is observed to obtain efficient cooling so that the heat generated in its operation will be adequately dissipated. An increase in the viscosity of the cooling and dielectric liquid would affect the heat dissipation characteristics of the transformer, thereby leading to heat accumulation. The resulting higher operating temperatures would affect the chemical stability of the insulation and would lead to increased dielectric losses. An increase of ten seconds in viscosity raises the normal operating temperature of a self-cooled transformer by about 1.8° F. An increase of viscosity of the dielectric and cooling liquid also is reflected in the low temperature operation of transformers. Water-cooled transformers are operated at temperatures below room temperature with permissible loads greater than the normal rating. Increased liquid viscosity in the normal range of transformer operation (100° F. and higher) is reflected as multiplied viscosity increase as the temperature falls below room temperature, thereby greatly reducing the heat dissipation properties of the transformer; and thus will reduce, and may even totally eliminate, the normally permissible transformer overload at lower temperatures.

Experience has also shown that for safe operation of large power transformers, a low pour point dielectric and cooling liquid is desired. Any increase in liquid viscosity is normally associated with an increase in the pour point, thereby increasing the hazard of clogged ducts, burst tank and radiator tubes, and other disastrous results resulting from the solidification of the dielectric liquid.

The addition of many metallic "soaps" to halogenated liquids may result in increased liquid viscosity. I have discovered, however, that adequate protection of the cellulose insulation against the destructive effects of hydrogen halide acids, and especially against the destructive effects of hydrogen halide acids, and especially against the chemical destruction of transformer insulation by hydrogen chloride, can be provided by the addition of amounts approximating one-half per cent of the protective agent. The amount of protective agent which is added should be so small that little if any change in the viscosity or pour point of the insulating liquid will result. Furthermore, some of the metallic salt protective agents of my invention are substantially insoluble in the halogenated liquids or liquid mixtures. As will be hereinafter described, these insoluble compounds are particularly applicable in one form of my invention in which the protective agent is incorporated directly with the cellulosic insulation to be protected.

Transformers are subject to the hazard of minor or major electrical arcing. In service, the transformer must frequently withstand overvoltage surges and lightning strokes of varying magnitude. These abnormally applied voltages subject the transformer to possible corona and arc phenomena. Some may even lead to the complete electrical breakdown of the transformer. The hydrogen chloride formed by corona or arc discharges will attack and weaken the cellulose insulation, and thereby shorten the useful life of the transformer. If actual breakdown of the transformer should occur, the weakening of the insulation may be so severe that the satisfactory repair of the transformer is impossible. As a consequence of my invention, this hazardous result is eliminated. As a consequence, more satisfactory functioning of the transformer occurs in normal commercial use. Should electrical breakdown occur for any reason whatsoever, necessary repairs are more easily made.

In one form of the present invention, the protective agent is dispersed in the chlorinated dielectric liquid. For example, a soluble protective agent may be dissolved in the halogenated liquid in a narrowly restricted amount such that the desired protection is obtained without objectionable increase in liquid viscosity. Not more than one per cent of the protective agent ordinarily is necessary to be dissolved in the halogenated liquid to give the required degree of protection against even the extreme condition established by the complete saturation of the liquid with hydrogen halide. Thus, when a mixture of 60 per cent chlorinated diphenyl containing 60 per cent chlorine and 40 per cent trichlorbenzene is subjected to electric arcs, or is otherwise saturated with hydrogen chloride at 75° C., the protective action of protective agents representative of my invention is illustrated by the following comparative results of the effect on the tensile strength of .003 inch manila paper after being soaked in such liquid at 75° C. for 24 hours, the amount of protective agent in all cases being one per cent:

Without the benefit of any protective agent, the loss of tensile strength is complete, or as high as 75 per cent. When a protective agent, as for example sodium oleate, sodium stearate, zinc naphthenate, or tin naphthenate, is present there is no loss of tensile strength.

My invention, however, is not limited to the type of protective agent shown as exemplary. Lead oleate, copper oleate, aluminum stearate, zinc stearate, copper naphthenate and aluminum naphthenate all are suitable for the purposes of my invention with acceptable protective results.

It is not necessary to use in all cases as much as one per cent of the protective agent. Satisfactory protection is obtained in normal transformer use with quantities as low as .25 per cent, although protection against extreme conditions is most surely guaranteed by the presence of larger proportions up to a maximum of one per cent. Higher concentrations are not normally desired because of the effect on the viscosity or pour point (or both) resulting from the presence of too great a concentration of the protective agent. Amounts of the protective agents added in accordance with my invention should not materially affect the viscosity or the pour point of the liquid.

A conventional chlorinated liquid composition for transformer insulating purposes has at 75° C. a viscosity of 37 seconds S. U. (Saybolt Universal) and a pour point of −38° C. When 1% of tin naphthenate is present therein the viscosity of the liquid composition is 38 seconds S. U. and the pour point is −36° C.

In further exemplification of my invention, it is sometimes advantageous to introduce the protective agent as a constituent part of the cellulosic insulation to be protected. This is especially applicable to transformers from which the operator, for reasons of utility in maintenance, drains the cooling and dielectric liquid from the transformer at intervals; replacing it by new and reconditioned liquid in order to insure that the dielectric properties may be maintained in the best condition, free from water or suspended solids. By the presence of a protective agent in the cellulose insulation of transformer windings, and one which is insoluble in the liquids, the functioning of the protective agent is always insured without the danger of its unintentional absence during the reconditioning of the liquid or the necessity of adding it to any new and untreated liquid which may be used.

For such purpose I prefer to incorporate about .25 per cent of the protective agent per unit of weight of cellulose used. Smaller and larger amounts of the protective agent may be used. However, in the most extreme cases of hydrogen chloride formation in the insulating liquid described, not more than one per cent of the protective agent has been found necessary to give the desired protection.

Among the protective agents which are sufficiently insoluble in the chlorinated liquid for purposes of my invention, the following are representative: zinc benzoate, sodium benzoate, ammonium benzoate, calcium stearate and lead oleate.

Manila paper containing from one-half to one per cent sodium benzoate, or zinc benzoate or calcium stearate or lead oleate, when dried and impregnated with a chlorinated dielectric and cooling liquid shows less than eight per cent loss in tensile strength when heated for 24 hours at 75° C. than untreated similar paper when immersed in the same chlorinated liquid which has been saturated with hydrogen chloride.

Although I have illustrated my invention with reference to one particular type of commercially used chlorinated dielectric and cooling liquid, I do not wish to be so limited. Other types of halogenated liquids are of equal utility in the utilization of my invention such as the chlorinated benzenes, alone, chlorinated diphenyl alone, benzotrifluoride, chlorinated benzotrifluoride, chlorinated ethyl benzene, chlorinated diphenyl oxide, chlorinated diphenyl methane, chlorinated diphenyl ketone, chlorinated naphthalene, and the like, as well as mixtures of such compounds mixed in any and all proportions.

The protective agent is most conveniently introduced during the manufacture of the paper or other form of fabric insulation. The protective agent may, however, be incorporated in the fabric insulation after assembly in the electrical apparatus by impregnation of the insulation with a suitable solution of the protective agent in a volatile solvent. The latter may be removed by evaporation in accordance with known methods, leaving the protective agent distributed throughout the body of the insulation itself.

The dielectric strength of a halogenated dielectric liquid is unaffected by the presence of the protective agent. The power factor of the treated paper and of the halogenated hydrocarbon is satisfactory for general use. The pour point, viscosity, and other physical properties of a liquid halogenated material in contact with such treated fabric insulation are substantially unaffected. The life of apparatus containing a protective fixative, such as herein described, is increased by its presence when such apparatus is operated under conditions tending to produce decomposition of halogenated hydrocarbon compounds.

What I claim as new and desire to secure by Letters Patent of the United States is:

1. A composition consisting of liquid halogenated aryl hydrocarbon having a viscosity not materially greater than about 58 seconds Saybolt at 100° F., and in admixture therewith one-quarter to one per cent of a compound of an organic acid chosen from the group consisting of naphthenic and benzoic acids and a metal chosen from the group consisting of zinc, tin, copper and aluminum, said compound having a chemical affinity for hydrogen halide and which does not substantially increase the viscosity of said composition.

2. A composition consisting of liquid chlorinated aryl hydrocarbon, which is susceptible to decomposition by an electric arc and has a viscosity not materially greater than about 58 seconds Saybolt at 100° F., and one-fourth to one per cent of tin naphthenate dissolved in said hydrocarbon, said tin naphthenate not substantially increasing the viscosity of said composition.

3. A composition of matter which is suitable for insulating and dielectric purposes in electric apparatus which consists of liquid chlorinated aryl hydrocarbon composition having a viscosity not materially greater than about 58 seconds Saybolt at 100° F. and one-quarter to one per cent of a compound of naphthenic acid and a metal chosen from the group consisting of zinc, tin, copper and aluminum which is capable of effectively combining with minute amounts of hydrogen chloride in said composition and which does not substantially increase the viscosity of said composition.

FRANK M. CLARK.

REFERENCES CITED

The following references are of record in the file of this patent:

UNITED STATES PATENTS

| Number | Name | Date |
| --- | --- | --- |
| 1,975,072 | Booth | Oct. 2, 1934 |
| 2,041,052 | Donaldson | May 19, 1936 |
| 2,105,406 | Clark | Jan. 11, 1938 |
| 2,105,407 | Clark | Jan. 11, 1938 |
| 2,222,964 | Voback | Nov. 26, 1940 |
| 2,259,978 | McLean | Oct. 21, 1941 |
| 2,274,674 | Earle | Mar. 3, 1943 |
| 2,354,171 | Morgan | July 18, 1944 |

FOREIGN PATENTS

| Number | Country | Date |
| --- | --- | --- |
| 378,084 | Great Britain | Aug. 8, 1932 |
| 545,500 | Great Britain | May 29, 1942 |